Patented June 15, 1943

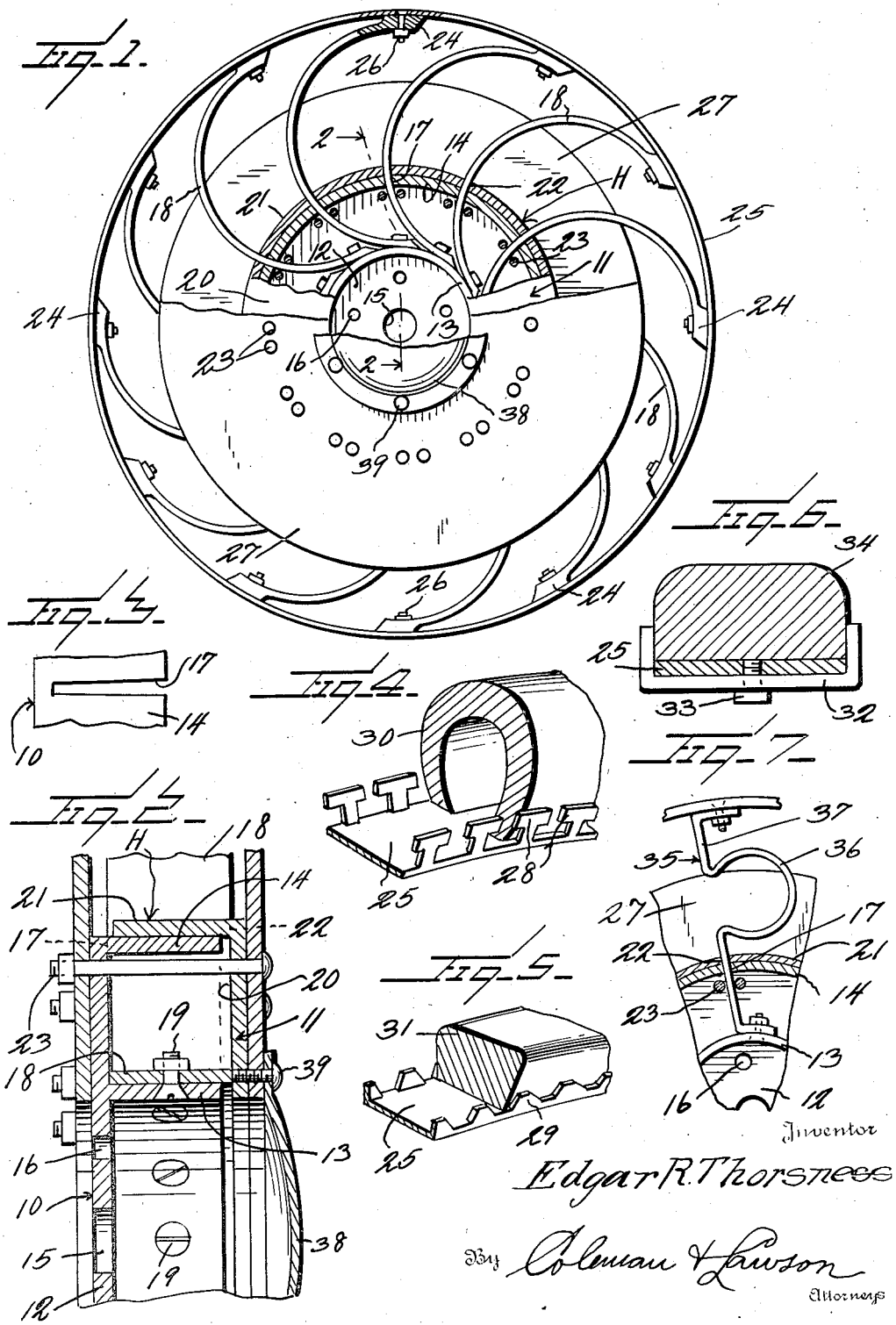

2,321,954

UNITED STATES PATENT OFFICE 2,321,954

SPRING WHEEL

Edgar R. Thorsness, Worthington, Minn.

Application June 19, 1942, Serial No. 447,693

4 Claims. (Cl. 152—86)

This invention relates generally to improvements in vehicle wheels and pertains particularly to an improved spring wheel.

In the various types of spring wheels heretofore produced the construction has been such that the maximum shock-absorbing action is not obtained, due principally to the fact that the rims, whether they be all metal or of metal and rubber construction or whether they carry a pneumatic tire, are so constructed or designed that there is no yield or give in the rim itself and, consequently, the sole yielding elements of the wheel are the spring parts between the rigid rim and the wheel axle, with the result that the wheel tends to bounce instead of flexing as it should in passing over rough or irregular terrain.

A principal object of the present invention is to provide an improved spring wheel which is designed or constructed in such manner as to overcome the objections above referred to as attendant upon the use of other types of spring wheels by the provision of a flat spring resilient tire which may be used as such for the support of the wheel or which may carry a solid or pneumatic tire, which spring tire gives or flexes as shocks are applied, in cooperation with the yielding or flexing of resilient or spring spokes so that the maximum of shock-absorbing action is obtained.

Another object of the invention is to provide in a spring wheel of the character above set forth, a novel rim construction whereby a solid or pneumatic tire may be readily mounted thereon and held firmly in position and the metallic rim still may flex and be constantly deformed from its normal circular form as the wheel is in use.

Still another object of the invention is to provide in a spring wheel of the type above set forth, a novel construction with regard to the manner in which the resilient or spring spokes are secured or attached to the hub portion of the wheel.

Still another object of the invention is to provide in a spring wheel structure a novel manner of attaching the outer ends or arcuate spoke members to the resilient flat spring tire or rim whereby rubbing contact between portions of the spokes and tire is prevented with the consequent prevention of the development of noise, and the packing of dirt between such portions of the spokes and the tire is also prevented.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Figure 1 is a view, partly in side elevation and partly in section, of a wheel constructed in accordance with the present invention.

Figure 2 is a partial section, on an enlarged scale, on the line 2—2 of Figure 1.

Figure 3 is a fragmentary detail of a drum flange showing a spoke slot.

Figure 4 illustrates the interrupted flange rim as made for a pneumatic tire.

Figure 5 illustrates the interrupted flange rim as made for a solid tire.

Figure 6 illustrates the use of a clamp for securing a tire to the unflanged rim.

Figure 7 illustrates the modified spoke construction.

Referring now more particularly to the drawing, it will be seen that the hub portion of the present spring wheel, which is indicated generally by the character H, comprises an inner drum generally designated 10 and an outer drum designated, as a whole, by the character 11. The inner drum 10 comprises a circular wall plate 12 from one side of which extends the spaced concentric inner and outer flanges 13 and 14 respectively. The plate 12 has at the center thereof an opening 15 to receive the end of an axle and around this opening are formed bolt openings or holes 16 which receive the securing bolts, not shown, by which the wheel is maintained in position upon the vehicle axle hub or brake drum.

The outer flange 14 of the drum 10 is provided with a plurality of slots 17 which extend from the free edge of the flange inwardly to the plate 12 and these slots 17 are tapered slightly so as to be of somewhat less width at their ends near the plate 12 than at the outer ends so as to tightly receive the hereinafter described spring spokes.

At equi-distantly spaced points around the inner flange 13 of the drum 10 are fixed the ends of arcuate or substantially semi-circular resilient flat metal spokes 18, by means of bolts 19. These spokes are arranged in symmetrical order around the drum, as illustrated, and each lies in a slot 17 of the outer flange 14.

In referring to the drums 10 and 11 as being, respectively, inner and outer drums reference is had to the relative positions of these drums axially of the wheel, while in referring to the flanges 13 and 14 as being, respectively, inner and outer flanges reference is had to their positions radially of the wheel axis.

The outer drum 11 comprises the annular plate 20, to the outer edge of which is integrally joined the flange 21 which encircles the flange 14 of the inner drum. This flange 21 is provided with slots or recesses 22 which receive the flat resilient spokes 18 and, consequently, are aligned with the flange slots 17 through which the spokes extend. The portion 20 of the outer drum covers the space between the free edges of the flanges 13 and 14, and thus hides the inner ends of the spokes and the bolts by which they are secured to the flange 13.

The two drums are coupled together by bolts 23 which, as shown, extend through the drums between the flanges 13 and 14 and are arranged in pairs which are closely adjacent to and between which the resilient spokes 18 extend. These tie bolts 23 draw the drums together and also force the spokes firmly into the tapered slots 14 and 22 so that the spokes will be firmly held and prevented from becoming noisy. In practice, the width of each spoke will be slightly greater than the length of the slot in which it positions and, consequently, when the drums are drawn together by the tie bolts the spokes will be forced firmly into position in the slots and will be clamped between the drums.

The outer end of each spoke is thickened to form a foot 24 and encircling these outer ends of the spokes is a flat spring tire of relatively thin metal, which is indicated generally by the numeral 25. The feet of the spokes bear against the inner face of this tire and are secured thereto by bolts 26. It will be readily apparent that by this construction, when the metallic tire 25 is flexed or deformed, adjacent portions of the curved spokes cannot come into contact with the inner face thereto and thus noise resulting from friction cannot develop. Also, the insetting of the thin outer end portions of the spokes where they join the feet 24, prevents dirt from packing between the spokes and the tire.

If desired, the metallic tire 25 may be used for the direct support of the wheel upon the ground or resilient treads or tires may be applied thereto if desired.

Upon the inner and outer sides of the wheel are located the flat cover disks 27 which may be centrally apertured to conform to the diameter of the interior of the flange 13 and these cover disks are secured in position preferably by the tie bolts 23 which secure the drums together. These shield or cover disks prevent the development of wind noise in the spokes when the wheel is rotating at a high speed and also add to the general appearance of the wheel by covering the inner ends of the spokes and the drums. It will be readily appreciated, however, that these cover disks or shields may be left off without impairing the efficiency of the wheel.

Where it may be desired to use a pneumatic or a solid rubber tire, the thin metal tire or rim 25 may be provided along its two edges with broken flanges, as indicated by the reference characters 28 and 29 in Figures 4 and 5. In connection with the broken flanges 28 a pneumatic tire 30 is shown, while a solid type of tire, indicated by the numeral 31, is shown in association with the broken flanges 29.

It will be readily apparent that by providing the broken flanges 28 and 29 flexing or deformation of the thin metal tire or rim portion 25 of which the flanges form a part, is not interfered with, whereas such deformation could not take place if the flanges were of solid construction or, in other words, continuous instead of being divided into sections as shown.

If desired, another mode of securing a resilient tread or tire upon the thin metal tire 25, may be employed, as shown in Figure 6, by the employment of clips or securing clamps of substantially U-shape which are placed across the tire 25 upon the inner side so as to have their ends extend radially outwardly part way across the applied resilient tire. Such a clamp is indicated by the numeral 32 and may be secured to the metallic tire 25 by a stud bolt 33. The pneumatic or resilient tire maintained in place upon the metallic tire 25, is here indicated by the numeral 34.

The numeral 35 in Figure 7 indicates a slightly modified form of spoke which may be employed in the place of the arcuate or semi-circular spokes 18. This modified spoke has the central portion 36 which is substantially a complete circle, with the oppositely directed end portions 37, one of which is secured to the metallic tire 25 by a bolt 26, while the other end extends through the aligned drum slots 17—22 and is secured by a bolt 19 to the inner flange 13 of the drum 10. Spokes constructed in the manner of spoke 35 give to the wheel construction a greater resiliency than that obtained by the use of the semi-circular or arcuate spokes 18.

From the foregoing it will be readily understood that in the present resilient wheel construction, in any of the several modifications thereof, resiliency is not only had in the spokes but in the metallic tire or rim connecting the outer ends of the spokes and, if desired, carrying a resilient tread or tire. Thus, flexing of the tire as a whole takes place in the operation of the wheel, this flexing of the metallic tire or rim being made possible by the novel construction of the flange which supports the resilient tread, when such tread is employed. Thus, when weight is applied to the wheel the entire tire flattens out or changes from a circular form to an elliptical form and, in addition to assisting in absorbing the shocks of the road, causes a greater surface to be presented to the road so that increased traction may be obtained.

The novel hub construction for the wheel provides for a strengthening or stiffening of the inner ends of the resilient spokes and also provides a housing which completely encloses the attached inner ends of such spokes, thereby enhancing the appearance of the wheel.

The central outer side of the wheel structure has disposed thereover the hub disk or cap which shields the end of the wheel axle, not shown, which extends through the axle opening 15. This hub cap, which is indicated generally by the reference character 38, may be secured in place by cap bolts or screws 39 extending through its periphery into the adjacent outer drum and through the intermediate shield plate or disk 27.

I claim:

1. A spring wheel comprising a hub unit consisting of a pair of concentric drums, each of said drums having a peripheral flange said peripheral flanges of the drums being in overlapped relation and having oppositely directed free edges, an annular flange rigid with one of the drums and lying within and spaced from the overlapping flanges, a plurality of resilient spokes of bandlike metal each secured at one end to the innermost annular flange and extending outwardly through slots formed in the overlapping flanges, the slots of the overlapping peripheral flanges opening through the free edges of such flanges, and a non-rigid tire encircling the outer ends of the spokes and having the latter secured thereto, said non-rigid tire being deformable to flex with the spokes.

2. A spring wheel construction as set forth in claim 1, in which said spokes are of substantially semi-circular form longitudinally and arranged with the convex side of each spoke opposing the concave side of an adjacent spoke.

3. A spring wheel construction as set forth in claim 1, in which each of said spokes has a central split ring formation with oppositely directed straight terminal portions aligned and extending radially of the wheel structure.

4. A spring wheel embodying a hub comprising two concentrically arranged drums having telescopically joined peripheral flanges, said flanges being radially spaced a substantial distance from the axis of the drums, a plurality of resilient spokes having their inner ends secured to one of the drums between said axis and the overlapping flanges and extending outwardly through guide slots in the flanges, and a non-rigid tire encircling the outer ends of the spokes and having the latter joined thereto, said non-rigid tire being flexible and deformable to contact with said resilient spokes in the absorption of the shock.

EDGAR R. THORSNESS.